(12) United States Patent
Nomiyama

(10) Patent No.: US 9,262,109 B2
(45) Date of Patent: Feb. 16, 2016

(54) PRINT INSTRUCTION APPARATUS, PRINTING SYSTEM, AND NON-TRANSITORY COMPUTER READABLE MEDIUM

(71) Applicant: FUJI XEROX CO., LTD., Minato-ku, Tokyo (JP)

(72) Inventor: Hideto Nomiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/452,046

(22) Filed: Aug. 5, 2014

(65) Prior Publication Data

US 2015/0268897 A1 Sep. 24, 2015

(30) Foreign Application Priority Data

Mar. 20, 2014 (JP) ................ 2014-059149

(51) Int. Cl.
*G06F 3/12* (2006.01)

(52) U.S. Cl.
CPC ............. *G06F 3/126* (2013.01); *G06F 3/121* (2013.01); *G06F 3/1286* (2013.01); *G06F 3/1287* (2013.01)

(58) Field of Classification Search
USPC .................................. 358/1.9, 1.13, 1.15
See application file for complete search history.

(56) References Cited

U.S. PATENT DOCUMENTS

| 7,400,427 | B2 * | 7/2008 | Honma ................. 358/1.15 |
| 7,872,771 | B2 * | 1/2011 | Kojima ............. H04N 1/00233 358/1.13 |
| 8,786,869 | B2 * | 7/2014 | Araki .................. G06F 3/1203 358/1.13 |
| 8,860,959 | B2 * | 10/2014 | Sakura ................. 358/1.13 |
| 2003/0206312 | A1 * | 11/2003 | McAfee et al. ............. 358/1.15 |
| 2011/0116131 | A1 * | 5/2011 | Mitsui .................. 358/1.15 |
| 2011/0261396 | A1 | 10/2011 | Takahashi |
| 2013/0293924 | A1 * | 11/2013 | Armstrong et al. ......... 358/1.15 |

FOREIGN PATENT DOCUMENTS

JP 2011-232940 A 11/2011

\* cited by examiner

*Primary Examiner* — Allen H Nguyen
(74) *Attorney, Agent, or Firm* — Sughrue Mion, PLLC

(57) ABSTRACT

A print instruction apparatus includes a designation storing unit that stores plural pieces of designation information, each designating a print condition not specifying any printer, a combination storing unit that stores a combination of any of the plural pieces of designation information, a group storing unit that stores a group of print settings which realize, in each of plural printers, designation indicated by each of the plural pieces of designation information stored in the designation storing unit, for each of the printers, and a constraint deriving unit that derives a constraint relationship common to the plural printers, on the basis of the combination and the group.

5 Claims, 8 Drawing Sheets

| FIRST ABSTRACT STATE | OUTPUT PAPER SIZE SUPPORTED FOR SHEET REVERSING OPERATION IS SPECIFIED |
|---|---|
| SECOND ABSTRACT STATE | DUPLEX PRINTING IS SPECIFIED |
| CONSTRAINT RELATIONSHIP 001 | OUTPUT SETTING SPECIFYING PAPER SIZE NOT SUPPORTED FOR SHEET REVERSING OPERATION AND DUPLEX PRINTING CANNOT BE SPECIFIED SIMULTANEOUSLY |

| | ABSTRACT STATE 001 | ABSTRACT STATE 002 |
|---|---|---|
| IMAGE FORMING APPARATUS 60a | (PRINT SETTING SET A001) [Output Size] = "A3"/"B4"/"A4"/"B5"/"A5"/"8.5 × 11" | (PRINT SETTING SET A002) [Duplexing] = "Long-side Binding"/"Short-Side Binding" |
| IMAGE FORMING APPARATUS 60b | (PRINT SETTING SET B001) [Output Size] = "A4"/"B5" | (PRINT SETTING SET B002) [Duplexing] = "Long-side Binding" |

FIG. 5A

| FIRST ABSTRACT STATE | OUTPUT PAPER SIZE SUPPORTED FOR SHEET REVERSING OPERATION IS SPECIFIED |
|---|---|
| SECOND ABSTRACT STATE | DUPLEX PRINTING IS SPECIFIED |
| CONSTRAINT RELATIONSHIP 001 | OUTPUT SETTING SPECIFYING PAPER SIZE NOT SUPPORTED FOR SHEET REVERSING OPERATION AND DUPLEX PRINTING CANNOT BE SPECIFIED SIMULTANEOUSLY |

FIG. 5B

| | ABSTRACT STATE 001 | ABSTRACT STATE 002 |
|---|---|---|
| IMAGE FORMING APPARATUS 60a | (PRINT SETTING SET A001)<br>[Output Size]<br>= "A3"/"B4"/"A4"/"B5"/"A5"/"8.5 × 11" | (PRINT SETTING SET A002)<br>[Duplexing]<br>= "Long-side Binding"/"Short-Side Binding" |
| IMAGE FORMING APPARATUS 60b | (PRINT SETTING SET B001)<br>[Output Size]<br>= "A4"/"B5" | (PRINT SETTING SET B002)<br>[Duplexing]<br>= "Long-side Binding" |

FIG. 5C

| | ABSTRACT STATE 001 | ABSTRACT STATE 002 |
|---|---|---|
| IMAGE FORMING APPARATUS 60a AND IMAGE FORMING APPARATUS 60b | (PRINT SETTING SET AB001 (= A001 ∩ B001))<br>[Output Size]<br>= "A4"/"B5" | (PRINT SETTING SET AB002 (= A002 ∩ B002))<br>[Duplexing]<br>= "Long-side Binding" |

FIG. 5D

| COMMON SETTING CONSTRAINT | (PRINT SETTING SET P001 (= $\overline{AB001}$ ∩ AB002))<br>{[Output Size] = "A5"/"B6"/"A6"/"Postcard"} × {[Duplexing] = "Long-side Binding"} |
|---|---|

PRINT INSTRUCTION APPARATUS, PRINTING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-059149 filed Mar. 20, 2014.

BACKGROUND

The present invention relates to a print instruction apparatus, a printing system, and a non-transitory computer readable medium.

SUMMARY

According to an aspect of the invention, there is provided a print instruction apparatus including: a designation storing unit that stores plural pieces of designation information, each designating a print condition not specifying any printer; a combination storing unit that stores a combination of any of the plural pieces of designation information; a group storing unit that stores a group of print settings which realize, in each of plural printers, designation indicated by each of the plural pieces of designation information stored in the designation storing unit, for each of the printers; and a constraint deriving unit that derives a constraint relationship common to the plural printers, on the basis of the combination and the group.

BRIEF DESCRIPTION OF THE DRAWINGS

Exemplary embodiment of the present invention will be described in detail based on the following figures, wherein:

FIGS. 5A through 5D are explanatory diagrams illustrating derivation of a common setting constraint;

DETAILED DESCRIPTION

An exemplary embodiment of the present invention will now be described in detail with reference to the accompanying drawings.

Image Forming System 1

Figure 1:
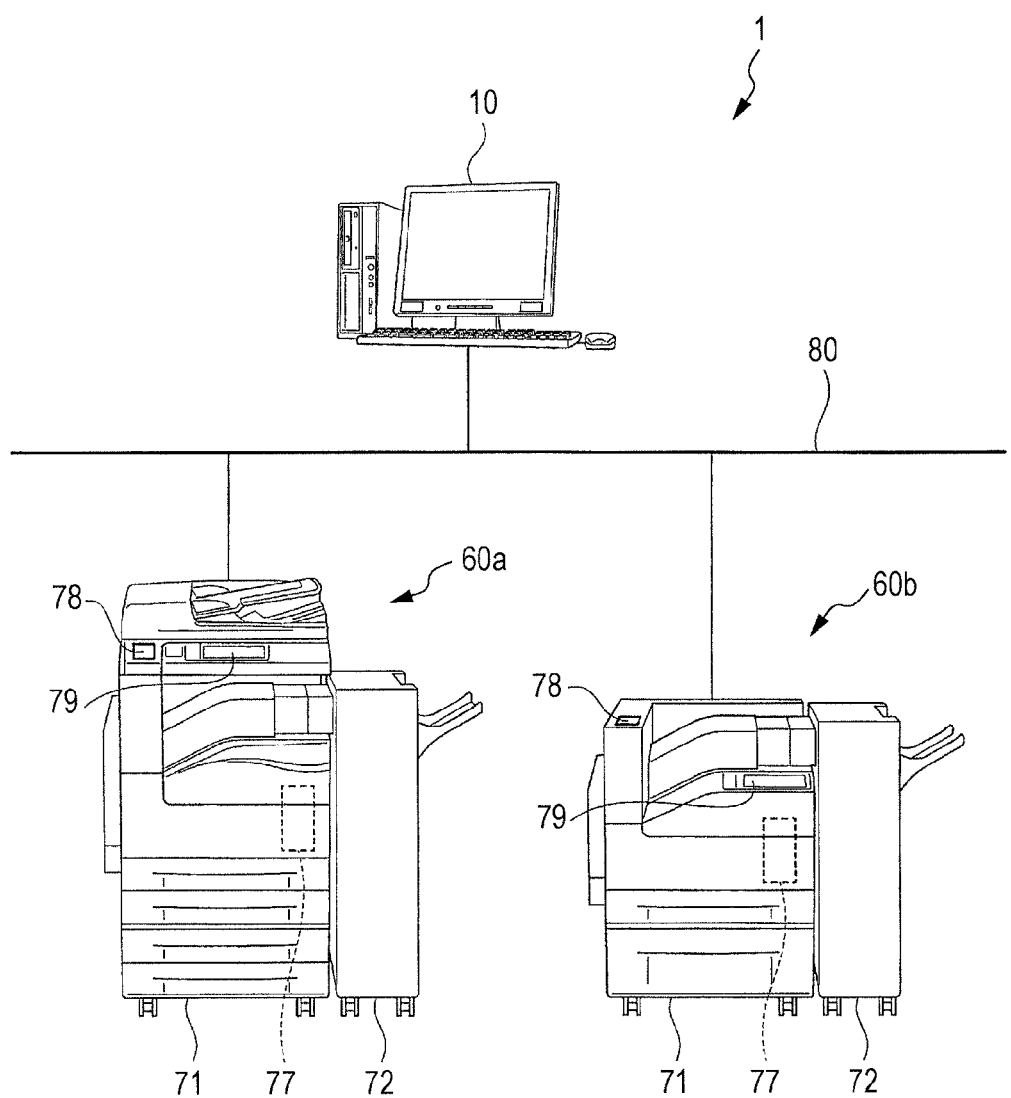
FIG. 1 illustrates the overall configuration of an image forming system to which an exemplary embodiment is applied.

FIG. 1 illustrates the overall configuration of an image forming system 1 to which the present exemplary embodiment is applied.

As illustrated in FIG. 1, the image forming system (printing system) 1 includes a terminal apparatus 10 and image forming apparatuses 60a and 60b, which are connected via a network 80.

The terminal apparatus 10 is an example of a print instruction apparatus, and is a computer apparatus that instructs the image forming apparatuses 60a and 60b to perform printing. The terminal apparatus 10 may be, for example, a personal computer (PC). In this case, the PC may be one that serves as a client PC, or may be one that serves as a server PC.

Each of the image forming apparatuses 60a and 60b is an example of a printer, and has an image forming function that forms an image on a medium such as paper. Each of the image forming apparatuses 60a and 60b may be a so-called multi-function apparatus having, for example, not only an image forming function, but also an image reading function for reading an image from media, such as paper, and a facsimile function. In FIG. 1, different reference numerals are assigned to the image forming apparatuses. However, in the following description, when reference is made to an arbitrary one of the image forming apparatuses, the arbitrary one of image forming apparatuses is referred to as an "image forming apparatus 60".

The network 80 is a communication network used for performing information communication between the terminal apparatus 10 and the image forming apparatuses 60. The network 80 may preferably be a local area network (LAN) or the Internet.

Image Forming Apparatus 60

The configuration of the image forming apparatus 60 will now be described with reference to FIG. 1.

As illustrated in FIG. 1, the image forming apparatus 60 includes an image forming unit 71 that forms an image on a sheet, and a post-processing unit 72 that performs post-processing, such as binding processing using staples, on a sheet on which an image is formed by the image forming unit 71. The image forming apparatus 60 further includes a controller 77 that controls mechanisms of the image forming apparatus 60, a communication I/F 78 that performs communication with the outside, and a user interface (UI) 79 including a display panel. The UI 79 receives an instruction from the user, and displays a message to the user.

Figure 2:
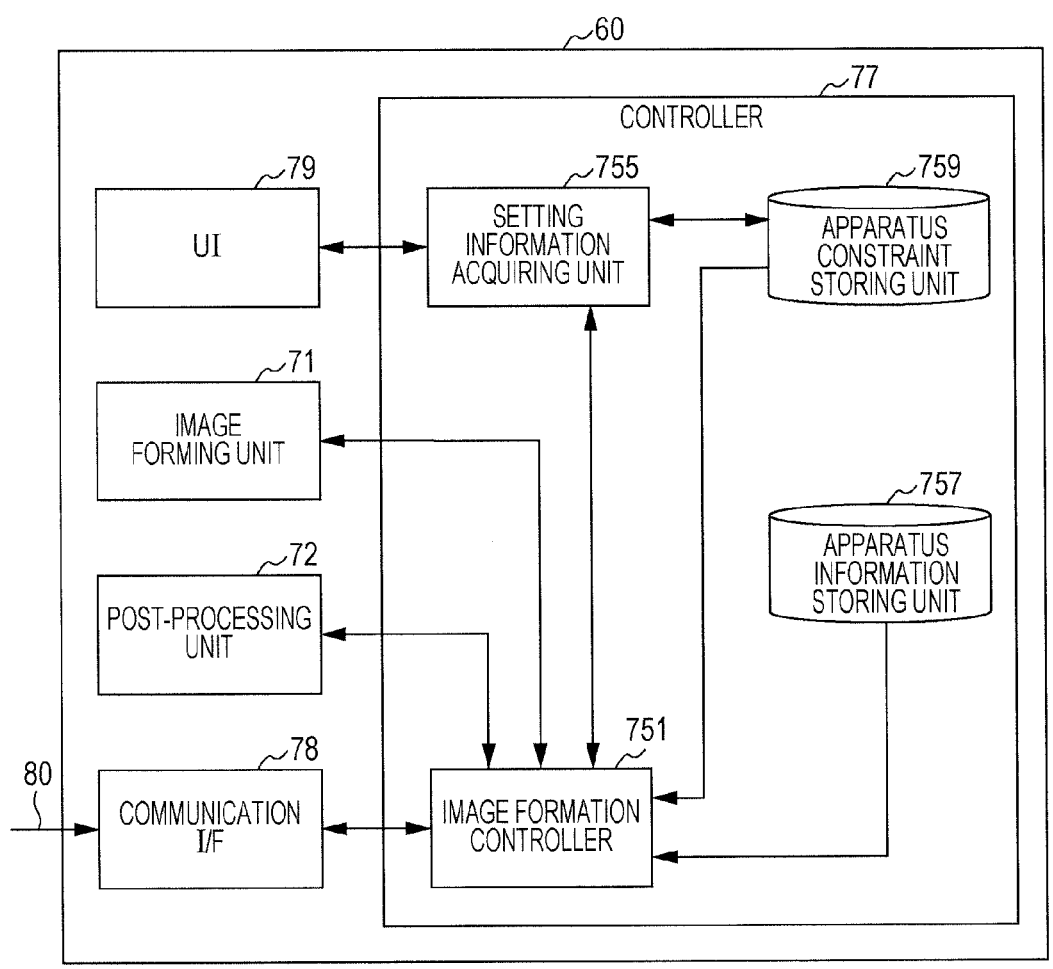
FIG. 2 illustrates an exemplary functional configuration of a controller to which the exemplary embodiment is applied.

FIG. 2 illustrates an exemplary functional configuration of the controller 77 to which the present exemplary embodiment is applied.

The controller 77 of the image forming apparatus 60 will now be described with reference to FIG. 2.

As illustrated in FIG. 2, the image forming apparatus 60 includes, as functions of the controller 77, an image formation controller 751, a setting information acquiring unit 755, an apparatus information storing unit 757, and an apparatus constraint storing unit 759.

The image formation controller 751 receives a print instruction from the terminal apparatus 10 via the communication I/F 78, and controls the image forming unit 71 and the post-processing unit 72. Further, the image formation controller 751 generates operation information of the image forming apparatus 60 on the basis of information stored, for example, in the apparatus information storing unit 757 and the apparatus constraint storing unit 759, and outputs the operation information to the outside via the communication I/F 78. Communication of the operation information of the image forming apparatus 60 may be performed using a well-known communication protocol for acquiring information on an apparatus connected via a communication unit. For example, management information base (MIB) information using Simple Network Management Protocol (SNMP) may be used.

The setting information acquiring unit 755 acquires information on an instruction from the user via the UI 79.

The apparatus information storing unit 757 stores output destination information including information for identifying the image forming apparatuses 60a and 60b as output destinations, such as model names, model numbers, and IP addresses of the image forming apparatuses 60a and 60b, and functional information including information on print functions of each of the image forming apparatuses 60a and 60b and information on print settings that can be set when performing these print functions. The term "print function" as used herein refers to processing performed on a sheet by the image forming unit 71 and the post-processing unit 72. Specific examples of print functions include duplex printing, binding processing, and multicolor image printing (color printing).

The apparatus constraint storing unit 759 stores an apparatus setting constraint as a constraint relationship in each of the image forming apparatuses 60a and 60b, in accordance with print functions of each of the image forming apparatuses 60a and 60b. The term "constraint relationship" as used herein refers to a combination of print settings that cannot be specified simultaneously when performing printing. Accordingly, the term "apparatus setting constraint" as used herein refers to a combination of print settings that cannot be specified simultaneously when performing printing in each of the image forming apparatuses 60a and 60b. For example, an apparatus setting constraint indicates that, in the image forming apparatus 60a, when Paper Size (a setting item) is set to Postcard (a setting value), Duplex Printing (a setting item) cannot be set to Long-side Binding (a setting value).

The controller 77 includes a central processing unit (CPU), a main memory, a magnetic disk drive (hard disk drive (HDD)) (not illustrated). The CPU performs arithmetic operations so as to realize the functions described above. The main memory is a storage area storing data used for execution of various programs. The magnetic disk drive is a storage area storing data input to the programs and data output from the programs.

Terminal Apparatus 10

Figure 3:
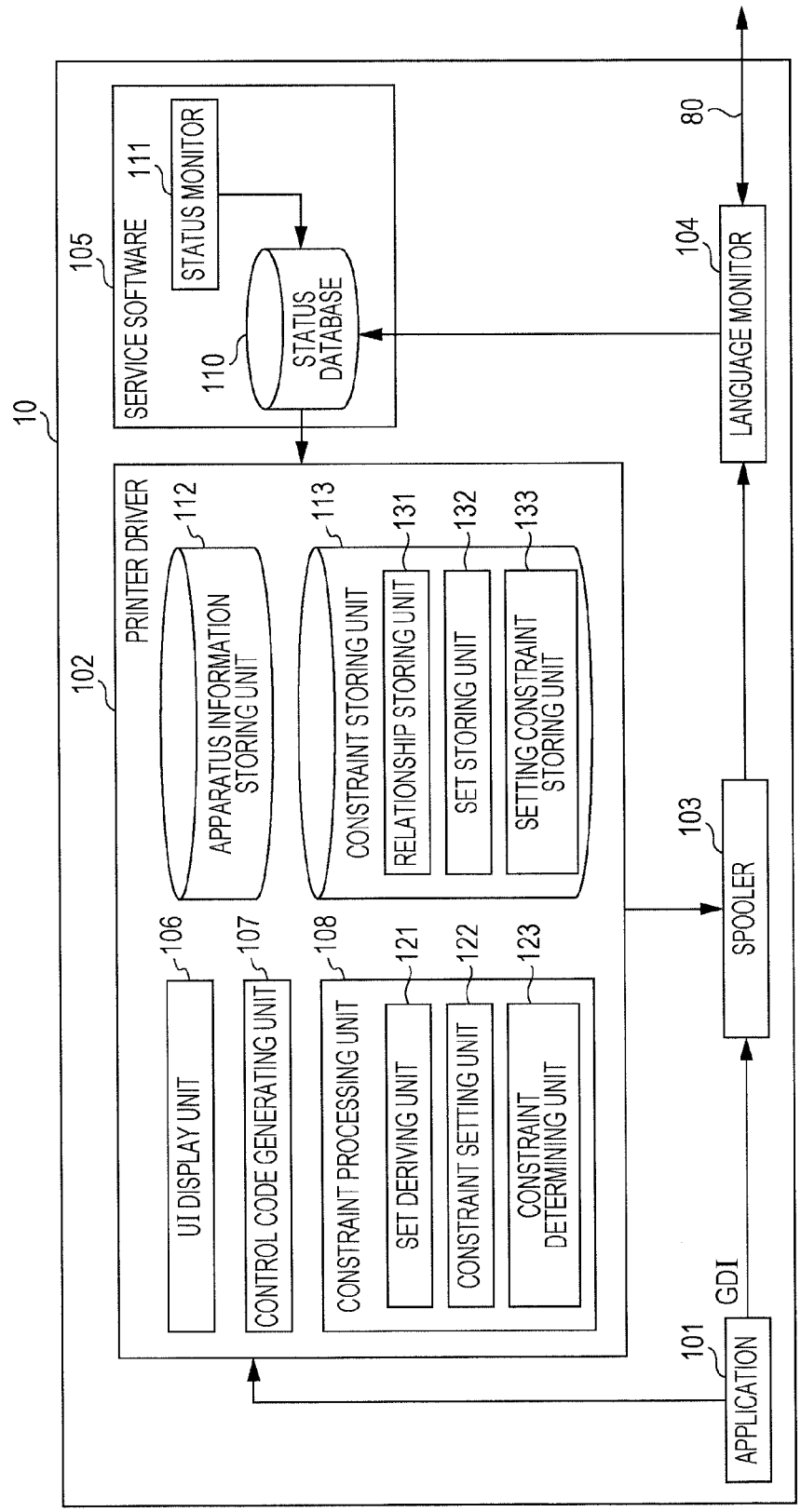
FIG. 3 illustrates an exemplary functional configuration of a terminal apparatus to which the exemplary embodiment is applied.

FIG. 3 illustrates an exemplary functional configuration of the terminal apparatus 10 to which the present exemplary embodiment is applied.

The terminal apparatus 10 will now be described with reference to FIG. 3. As illustrated in FIG. 3, an application program (hereinafter referred to as an "application") 101, a printer driver 102, a spooler 103, a language monitor 104, and service software 105 run on the terminal apparatus 10.

The application 101 is a program for creating original data and importing created original data, in response to a user operation.

The printer driver 102 is a program for transmitting a print instruction to the image forming apparatus 60 via the spooler 103 and the language monitor 104 in response to a request for printing based on original (print) data from the application 101, and controlling output of the original by the image forming apparatus 60. The printer driver 102 will be described in detail below.

The spooler 103 is a program for temporarily storing print instruction data to be output to the image forming apparatus 60 via a graphic device interface (GDI) as a draw command of an electronic document, in response to a print instruction from the printer driver 102, and taking print instruction data and transmitting the data to the language monitor 104 in accordance with a predetermined rule. The spooler 103 may be a Windows (trademark) spooler, for example.

The language monitor 104 performs two-way communication with the image forming apparatus 60 so as to monitor the status of the image forming apparatus 60 and transmit PDL data to the image forming apparatus 60.

The language monitor 104 queries the image forming apparatus 60 so as to acquire operation information of the image forming apparatus 60, at predetermined time intervals, for example. This operation information is acquired, for example, by the language monitor 104 using MIB information of the image forming apparatus 60.

The service software 105 acquires the operation information of the image forming apparatus 60, and reports the acquired operation information to the user. The service software 105 serves as a status database 110 and a status monitor 111.

The status database 110 stores the operation information of the image forming apparatus 60 reported from the language monitor 104.

The status monitor 111 performs display on a display mechanism 15 (described below) of the terminal apparatus 10 or the like, on the basis of the operation information of the image forming apparatus 60 stored in the status database 110, at predetermined time intervals.

The printer driver 102 will now be described in detail.

The printer driver 102 is capable of serving as a so-called universal driver that can alone provide functions equivalent to those of a dedicated driver for plural models. Installing the printer driver 102 in the terminal apparatus 10 eliminates the need to separately install another printer driver when, for example, a new image forming apparatus (not illustrated) other than the image forming apparatuses 60a and 60b is added to the image forming system 1. Further, the universal driver that supports plural models provides operations corresponding to a specified model (which is, for example, specified in the property settings of the printer driver or by detecting a connection destination apparatus), while retaining print settings and setting constraints for the plural models. Accordingly, the cost for adding a new image forming apparatus is reduced.

Further, unlike the case in which printer drivers for operating the respective image forming apparatuses 60a and 60b are individually provided, in the case of the printer driver 102, it is only needed to display a single icon of the printer driver 102 on the display mechanism 15 (described below) of the terminal apparatus 10.

The terminal apparatus 10 includes, as functions of the printer driver 102, a UI display unit 106, a control code generating unit 107, a constraint processing unit 108, an apparatus information storing unit 112, and a constraint storage unit 113.

The UI display unit 106 serves as a user interface for the user. That is, the UI display unit 106 presents information for the display mechanism 15 (described below) of the terminal apparatus 10, and receives an operation from the user via the display mechanism 15.

The control code generating unit 107 generates, as PDL data written in, for example, a page description language (PDL), a print instruction data for instructing the image forming apparatus 60 to perform printing, on the basis of original data that is the subject of a print instruction issued by the application 101.

The constraint processing unit 108 derives a common setting constraint, and makes a determination on a print setting instruction received from the user, in accordance with the derived common setting constraint. The term "common setting constraint" as used herein refers to a combination of print settings that cannot be specified simultaneously in either of the image forming apparatuses 60a and 60b operated by the printer driver 102. This common setting constraint is an example of a constraint relationship common to plural printers.

An example of a common setting constraint is a combination of a set of output paper sizes supported for a sheet reversing operation in the example of FIG. 5D described below, namely, "A5", "B6", "A6", and "Postcard" as a set of output paper sizes supported for a sheet reversing operation ([Output Size] in FIG. 5D), and a set of print settings that realize duplex printing, namely, "Long-side Printing" as a set of print settings that realize duplex printing ([Duplexing] in FIG. 5D).

In the case where, for example, the printer driver 102 is a PostScript printer driver, the common setting constraint may be defined in a PostScript Printer Description (PPD) file.

The terminal apparatus 10 includes, as functions of the constraint processing unit 108, a set deriving unit 121, a constraint setting unit 122, and a constraint determining unit 123.

The set deriving unit 121 derives a set of print settings that satisfy each abstract state contained in a group of abstract states stored in a relationship storing unit 131 (described below), in each of the image forming apparatuses 60a and 60b.

Further, the constraint setting unit 122 is an example of a constraint deriving unit, and derives a common setting constraint, on the basis of a group of abstract constraint relationships stored in the relationship storing unit 131 and a set of print settings stored in a set storing unit 132 (described below).

It is noted that an abstract state is an abstract representation of a state in which a certain print setting is specified, without dependence on the model of the image forming apparatuses 60a and 60b (specific models). The term "group of abstract states" as used herein refers to a set containing one or more abstract states as its elements. The term "abstract constraint relationship" as used herein refers to a relationship in which two arbitrary abstract states cannot exist simultaneously. A group of abstract constraint relationships refers to a set containing one or more abstract constraint relationships as its elements.

Further, examples of abstract states include a first abstract state (a state in which the output paper sizes supported for a sheet reversing operation are specified) and a second abstract state (a state in which Duplex Printing is specified) (both described below). An example of a group of abstract states is a set containing the first abstract state and the second abstract state as its element. An example of an abstract constraint relationship is a relationship in which the first abstract state and the second abstract state cannot exist simultaneously. Note that an abstract state may be regarded as designation of a print condition not specifying any printer.

The constraint determining unit 123 is an example of a determining unit, and determines whether print setting content specified by the user corresponds to constraint processing, on the basis of a common setting constraint stored in a setting constraint storing unit 133 (described below).

The apparatus information storing unit 112 stores functional information of each of the image forming apparatuses 60a and 60b, which is acquired from the image forming apparatuses 60a and 60b via the language monitor 104 and the status database 110. This functional information is stored for each of the image forming apparatuses 60a and 60b.

The constraint storing unit 113 stores information that is needed when the constraint processing unit 108 derives a common setting constraint and makes a determination in accordance with the common setting constraint.

The terminal apparatus 10 includes, as functions of the constraint storing unit 113, the relationship storing unit 131, the set storing unit 132, and the setting constraint storing unit 133.

The relationship storing unit 131 is an example of a designation storing unit and a combination storing unit, and stores information that is needed when the constraint processing unit 108 derives a common setting constraint and makes a determination in accordance with the common setting constraint. More specifically, the relationship storing unit 131 stores each of a group of abstract states and a group of abstract constraint relationships. The group of abstract states and the group of abstract constraint relationships may be stored (defined) in advance in the relationship storing unit 131, or may be defined by the user through the UI display unit 106.

The set storing unit 132 is an example of a group storing unit, and stores a set of print settings derived by the set deriving unit 121, for each of the image forming apparatuses 60a and 60b. The term "set of print settings" as used herein refers to a collection of zero or more print settings (concrete setting items and setting values (parameters) of the respective setting items). That is, the term "set of print settings" as used herein refers to a collection (a group) of types of print settings.

The setting constraint storing unit 133 stores common setting constraints that are set by the constraint setting unit 122.

Figure 4:
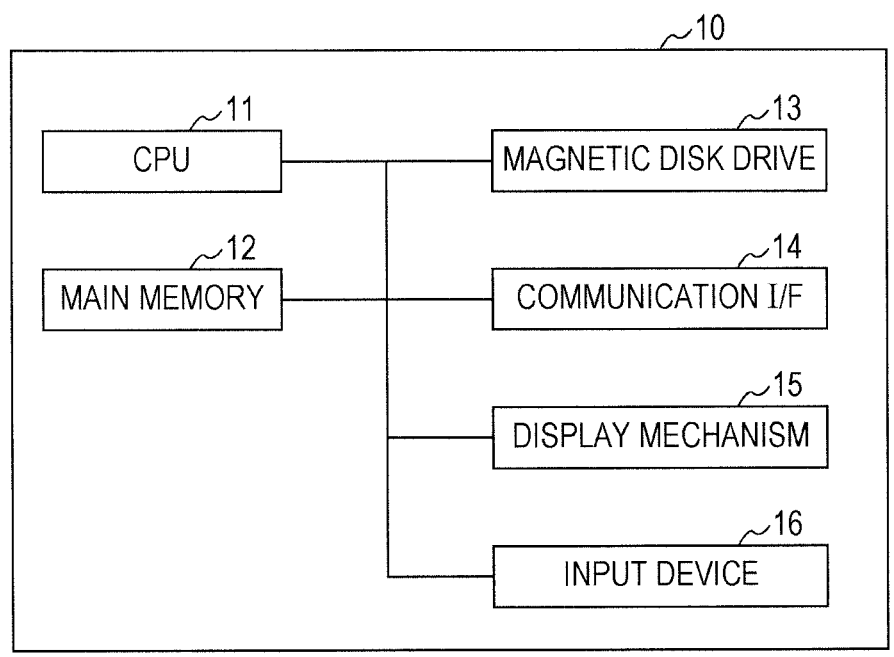
FIG. 4 illustrates the hardware configuration of the terminal apparatus.

FIG. 4 illustrates the hardware configuration of the terminal apparatus 10.

The hardware configuration of the terminal apparatus 10 will now be described with reference to FIG. 4.

The terminal apparatus 10 includes a CPU 11 serving as a computing unit, a main memory 12 serving as a storage unit, and a magnetic disk drive (hard disk drive (HDD)) 13. The CPU 11 executes various types of software such as the operating system (OS) and applications so as to realize the functions described above. The main memory 12 is a storage area for storing various types of software and data used for execution of the software. The magnetic disk drive 13 is a storage area for storing data input to the various types of software and data output from the various types of software and the like.

The terminal apparatus 10 further includes a communication interface I/F 14 for communicating with the outside, the display mechanism 15 including a video memory and a display, and an input device 16, such as a keyboard and a mouse, as an example of a receiving unit.

Derivation of Common Setting Prohibition

FIGS. 5A through 5D are explanatory diagrams illustrating derivation of a common setting constraint.

The terminal apparatus 10 to which the present exemplary embodiment is applied includes the printer driver 102 that serves as a so-called universal driver, as mentioned above. There may be a case in which, for example, the user wishes to make some changes to the printer driver 102 before causing the image forming apparatus 60 to perform print processing, in order to customize (make some changes to) the print settings. There may also be a case in which when, for example, adding a new image forming apparatus (not illustrated) to the image forming system 1, the user wishes to make some updates (changes) to the printer driver 102 such that the same print settings are applied to both the new image forming apparatus and the existing image forming apparatus 60.

It is now assumed that the image forming apparatus 60b is newly added, as an output destination, to the image forming system 1 including the terminal apparatus 10 and the image forming apparatus 60a, as illustrated in FIG. 1. The following describes processing for generating a common setting constraint which is performed for updating the printer driver 102 in such a case.

In the image forming apparatuses 60a and 60b in the example illustrated in FIG. 1, available print settings are "Output Size" which is a print setting related to the paper size on which an image can be formed, and "Duplexing" which is a print setting related to duplex printing.

The setting values that can be set as "Output Size" for the image forming apparatus 60a are "A3", "B4", "A4", "B5", "A5", "B6", "A6", "8.5×11", "10×11", "Postcard" and "Japanese Envelop Chou #3". The setting values that can be set as "Duplexing" for the image forming apparatus 60a are "Disabled", "Long-side Binding", and "Short-side binding".

On the other hand, the setting values that can be set as "Output Size" for the image forming apparatus 60b are "A4", "B5", "A5", "B6", "A6", "Postcard" and "Double Postcard". The setting values that can be set as "Duplexing" for the image forming apparatus 60b are "Disabled" and "Long-side Binding".

Further, the setting values that can be set as "Output Size" for both the image forming apparatuses 60a and 60b are "A4", "B5", "A5", "B6", "A6", and "Postcard". The setting values that can be set as "Duplexing" for the both are "Disabled" and "Long-side Binding".

As illustrated in FIG. 5A, a state in which the output paper sizes supported for a sheet reversing operation are specified is selected as a first abstract state, and a state in which duplex printing is specified is selected as a second abstract state, from a group of abstract states that are, for example, stored in advance in the relationship storing unit 131.

Subsequently, a constraint relationship is set by associating the first abstract state and the second abstract state. More specifically, a constraint relationship is set such that "State Other Than First Abstract State" and "Second Abstract State" cannot exist simultaneously. The constraint relationship (constraint relationship 001) described above is "the output setting specifying paper sizes not supported for a sheet reversing operation and the duplex printing cannot be specified simultaneously". This constraint relationship is stored in the relationship storing unit 131 of the constraint storing unit 113.

Subsequently, for each of the image forming apparatuses 60a and 60b, a set of print settings that can realize the first abstract state and the second abstract state is derived, on the basis of the first abstract state and the second abstract state stored in the relationship storing unit 131, and the print settings that can be set when performing the print functions stored in the apparatus information storing unit 757.

A detailed description will be given with reference to FIG. 5B.

First, as for the image forming apparatus 60a, a set of print settings that can realize the first abstract state, that is, a set of output paper sizes supported for a sheet reversing operation (a print setting set A001), includes "A3", "B4", "A4", "B5", "A5", and "8.5×11". Further, as for the image forming apparatus 60a, a set of print settings that can realize the second abstract state, that is, a set of print settings that realize duplex printing (a print setting set A002), includes "Long-side Binding" and "Short-side Binding".

On the other hand, as for the image forming apparatus 60b, a set of print settings that can realize the first abstract state (a print setting set B001) includes "A4" and "B5", and a set of print settings that can realize the second abstract state (a print setting set B002) includes "Long-side Binding".

Subsequently, on the basis of a group of the sets of print settings described above, a set which includes print settings that can realize the first abstract state and the second abstract state and which is common to the image forming apparatuses 60a and 60b is derived.

A detailed description will be given with reference to FIG. 5C.

First, a set which includes print settings that can realize the first abstract state, that is, a set which includes output paper sizes supported for a sheet reversing operation, and which is common to the image forming apparatuses 60a and 60b (a print setting set AB001) can be derived as the intersection of the print setting set A001 and the print setting set B001. Accordingly, the print setting set AB001 includes "A4" and "B5". Further, a set which includes print settings that can realize the second abstract state, that is, a set which includes print settings that realize duplex printing, and which is common to the image forming apparatuses 60a and 60b (a print setting set AB002) can be derived as the intersection of the print setting set A002 and the print setting set B002. Accordingly, the print setting set AB002 includes "Long-side Binding".

Then, a set of print settings (a print setting set P001) that correspond to the abstract state defined by the above-described constraint relationship 001 is derived. In other words, a common setting constraint that both the image forming apparatuses 60a and 60b need to fix is derived. "Solving a constraint" means avoiding a print setting corresponding to a constraint and specifying another print setting not corresponding to the constraint.

More specifically, referring to FIG. 5D, a print setting set P001 can be derived as the intersection of the complement of the print setting set AB001 and the print setting set AB002. Accordingly, a common setting constraint is a combination of any of "A5", "B6", "A6", and "Postcard" selected as "Output Size" and "Long-side Binding" selected as "Duplexing".

Print Setting Processing

Figure 6:
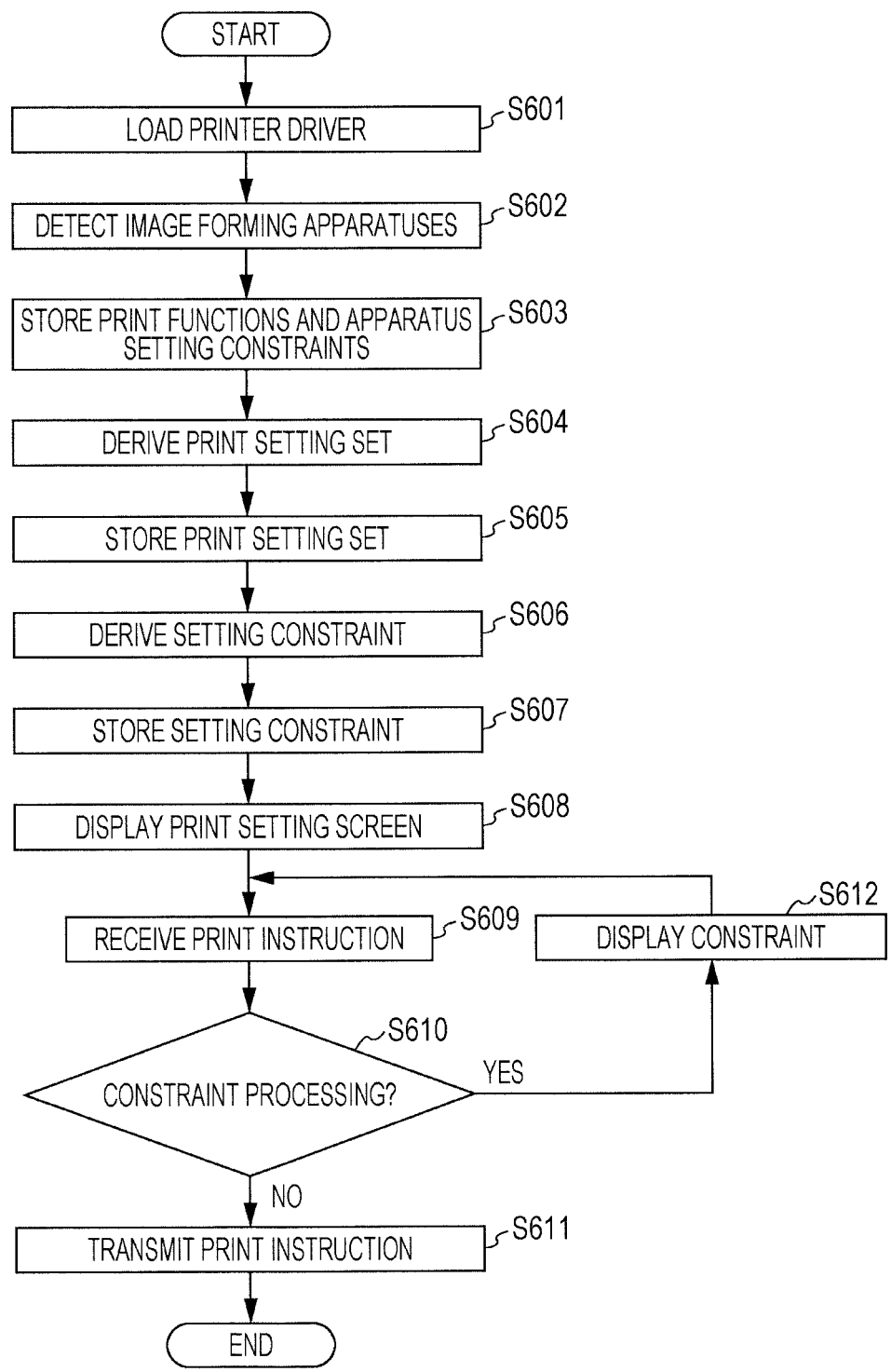
FIG. 6 is a flowchart illustrating an example of processing a print setting.

FIG. 6 is a flowchart illustrating an example of processing a print setting.

The following describes specific operations performed by the printer driver 102 when making print settings with reference to FIG. 6. As mentioned above, the relationship storing unit 131 of the printer driver 102 stores in advance the first abstract state, the second abstract state, and the abstract constraint relationship between the first abstract state and the second abstract state.

As illustrated in FIG. 6, first, when the user performs printing, the application 101 loads the printer driver 102 in response to, for example, an operation of the input device 16 (step S601). When the printer driver 102 is loaded, the printer driver 102 detects the image forming apparatuses 60a and 60b that are connected to the network 80 (see FIG. 1) by referring to the status database 110 (step S602). Then, the print functions and apparatus setting constraints of each of the image forming apparatuses 60a and 60b are read from the apparatus information storing unit 757 and the apparatus constraint storing unit 759 of each of the detected image forming apparatuses 60a and 60b, and are stored in the apparatus information storing unit 112 (step S603).

Subsequently, the set deriving unit 121 of the printer driver 102 derives a print setting set, on the basis of the first and second abstract states stored in the constraint storing unit 113 and the print functions stored in the apparatus information storing unit 112 (step S604). More specifically, as described above, a set of print settings that can realize the first abstract state and a set of print settings that can realize the second abstract state are derived for each of the image forming apparatuses 60a and 60b (see FIG. 5B), and the derived sets of print settings are stored in the set storing unit 132 for each of the image forming apparatuses 60a and 60b (step S605).

Subsequently, the constraint setting unit 122 of the printer driver 102 derives a set of print settings common to the image forming apparatuses 60a and 60b, on the basis of abstract constraint relationships stored in the relationship storing unit 131 and a set of print settings stored in the set storing unit 132 (see FIG. 5C). The constraint setting unit 122 also derives a common setting constraint that both the image forming apparatuses 60a and 60b need to fix (step S606, see FIG. 5D), and stores the common setting constraint in the setting constraint storing unit 133 (step S607).

Subsequently, the UI display unit 106 causes the display mechanism 15 to display a print setting screen 151 (described below) (step S608). Then, the UI display unit 106 receives an instruction for print settings from the user through, for example, an operation of the input device 16 (step S609). Then, the constraint determining unit 123 determines whether the content of the received print settings corresponds to constraint processing, on the basis of the common setting constraint stored in the setting constraint storing unit 133 (step S610).

If the content of the received print settings does not correspond to constraint processing (NO in step S610), a print instruction is transmitted to the image forming apparatus 60 (step S611).

On the other hand, if the content of the received print settings corresponds to constraint processing (YES in step S610), the UI display unit 106 causes the display mechanism 15 to display a constraint screen 161 (described below) (step S612). Then, the UI display unit 106 receives again an instruction for print settings from the user (step S609).

Figure 7A:
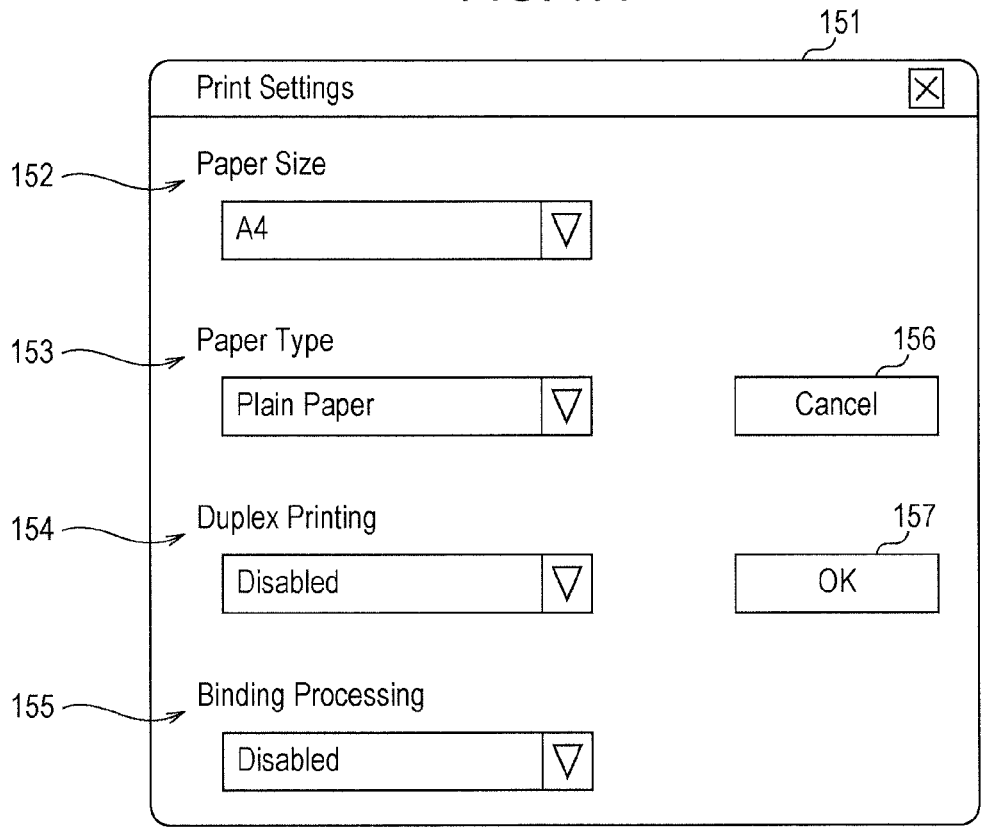
FIG. 7A illustrates an example of a print setting screen displayed on a display mechanism.
Figure 7B:
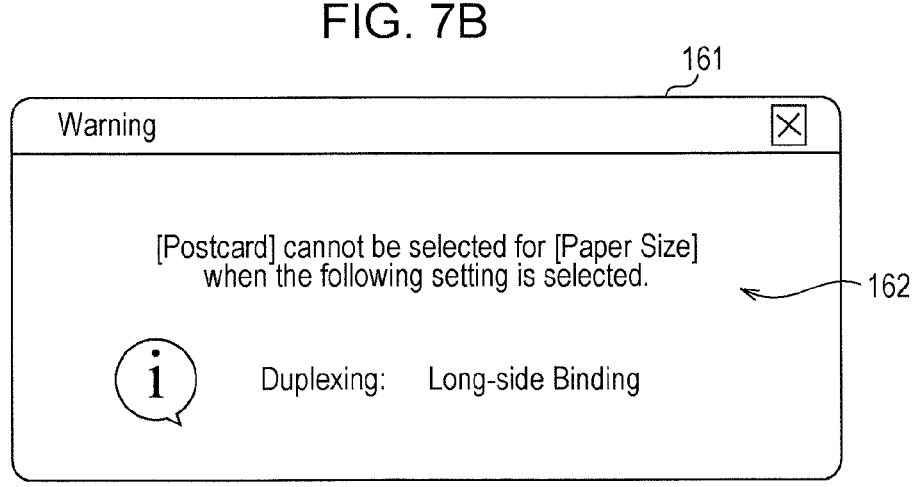
FIG. 7B illustrates an example of a constraint screen displayed on the display mechanism.

FIG. 7A illustrates an example of the print setting screen 151 displayed on the display mechanism 15, and FIG. 7B illustrates an example of the constraint screen 161 displayed on the display mechanism 15.

The following describes examples of the print setting screen 151 and the constraint screen 161 displayed on the display mechanism 15, with reference to FIGS. 7A and 7B.

Referring to FIG. 7A, the print setting screen 151 is a screen for receiving an instruction for print settings from the user. In the example illustrated in FIG. 7A, the print setting screen 151 includes a paper size setting item 152 and a paper type setting item 153, as setting items related to paper. Further, the print setting screen 151 includes a duplex printing setting item 154 and a binding processing setting item 155, as print items related to print functions that both the image forming apparatuses 60a and 60b have among the print functions of the image forming apparatuses 60a and 60b which are stored in the apparatus information storing unit 112. Further, the print setting screen 151 includes a cancel button 156 for canceling a print instruction, and an OK button 157 for executing a print instruction. When, for example, the OK button 157 of the print setting screen 151 is pressed, the printer driver 102 receives a print instruction with the settings displayed on the print setting screen 151 (see step S609 of FIG. 6).

Referring then to FIG. 7B, the constraint screen 161 includes a constraint indication 162, which displays information indicating that there is a constraint on execution of the content when the content of the received print settings is not executable (YES in step S610 of FIG. 6).

When the constraint screen 161 is displayed, the user is notified of the need to change the print settings.

As described above, in the present exemplary embodiment, a common setting constraint is derived on the basis of the first abstract state and the second abstract state. As a mode for deriving a common setting constraint, there may be a mode for sequentially fixing constraints, with respect to each of apparatus setting constraints of each of the image forming apparatuses 60a and 60b, and for each of the image forming apparatuses 60a and 60b, that is, a mode for sequentially avoiding print settings corresponding to constraints, unlike the present exemplary embodiment. In this mode, if a value for a print setting corresponding to a constraint is changed, constraints are sequentially fixed, so that the related print settings are changed accordingly. As a result, print settings that do not cause inconsistency in the model performances of the image forming apparatuses 60a and 60b are provided.

However, in this mode, since the apparatus setting constraints of the image forming apparatuses 60a and 60b are independent from each other, there might be a case in which, for example, the result of fixing a constraint in the image forming apparatus 60a corresponds to an apparatus setting constraint in the image forming apparatus 60b. It is therefore necessary to ensure consistency in the result of fixing constraints between the image forming apparatuses 60a and 60b. Further, even if consistency is ensured between the image forming apparatuses 60a and 60b, it is necessary to confirm whether the result does not correspond to any apparatus setting constraint in each of the image forming apparatuses 60a and 60b. Furthermore, since the print settings and apparatus setting constraints differ between models, it is difficult to perform such processing for all the plural models. Further, there might be a case in which there are an excessively large number of relationships to be confirmed, and therefore the result of fixing constraints does not converge.

On the other hand, in the present exemplary embodiment, constraints are fixed at once in the image forming apparatuses 60a and 60b by a batch operation through the print setting screen 151. Further, in accordance with the configuration of the image forming system 1, that is, the usage environment of the user, a common driver that effectively uses the print functions of the image forming apparatuses 60a and 60b included in the usage environment can be used. Furthermore, apparatus constraint relationships are simultaneously fixed in the plurality of models, that is, the image forming apparatuses 60a and 60b.

Further, since the printer driver 102 includes the constraint storing unit 113, the apparatus constraint storing unit 759 does not have to be provided in each of the image forming apparatuses 60a and 60b. If the apparatus constraint storing unit 759 is not provided, it is possible to generate a common constraint definition/a common model-dependent definition. Thus, for example, when adding a new image forming apparatus (support model) to the printer driver 102, operations for updating the printer driver 102 are simplified.

In the printer driver 102 described above, in the case where, for example, the terminal apparatus 10 is connected to the single image forming apparatus 60a, a constraint is derived using the print setting set A001, the print setting set A002, and the constraint relationship 001 that is not dependent on the model of the image forming apparatus 60a. Thus, processing is performed according to this constraint. Further, in this case, the constraint setting unit 122 derives a constraint to be fixed by the image forming apparatus 60a, and stores the constraint in the setting constraint storing unit 133. Then, the constraint determining unit 123 determines whether the content of print settings corresponds to constraint processing, in accordance with the constraint stored in the setting constraint storing unit 133 (see step S610 of FIG. 6). That is, the constraint setting unit 122 is applicable to a set of print settings that can realize the first abstract state and the second abstract state for the single image forming apparatus 60a.

Modifications

Figure 8:
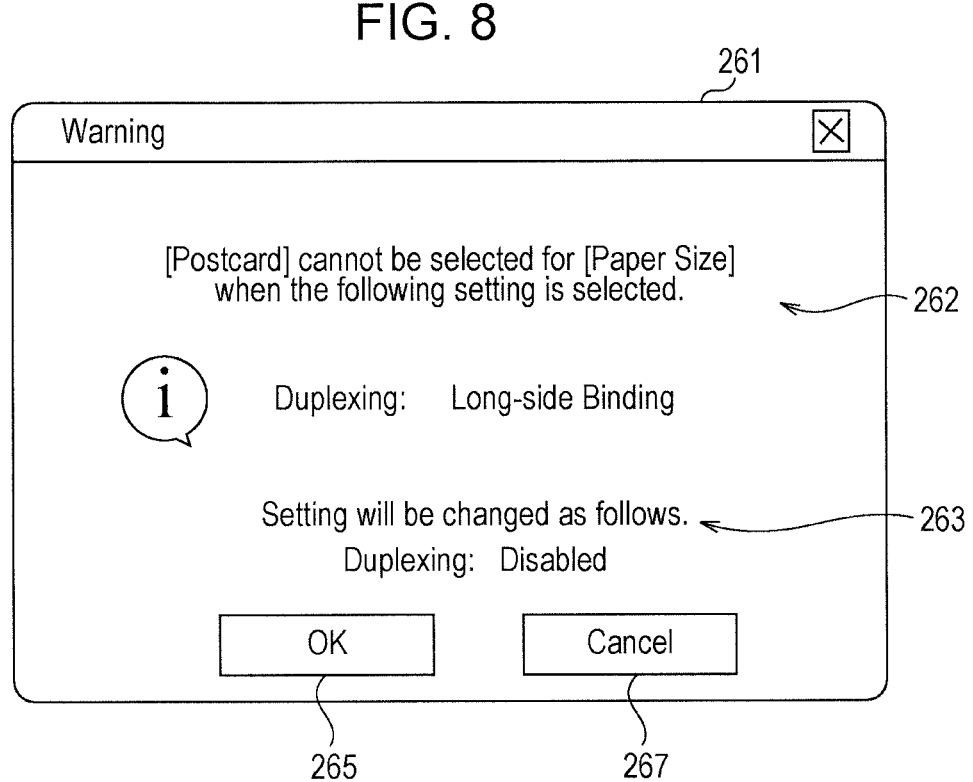
FIG. 8 illustrates an example of a constraint screen displayed on the display mechanism in a modification.

FIG. 8 illustrates an example of a constraint screen 261 displayed on the display mechanism 15 in a variation.

In the above-described exemplary embodiment, in the case where the content of print settings received through the print setting screen 151 corresponds to constraint processing, the constraint screen 161 is displayed. However, the present invention is not limited thereto.

For example, as illustrated in FIG. 8, the constraint screen 261 may be used. The constraint screen 261 includes a constraint indication 262 that displays information indicating that there is a constraint on execution of the received print setting, a setting change indication 263 that displays information indicating that the print setting (setting value) on which a constraint is placed is to be changed to an executable setting value, an OK button 265 for allowing the change displayed in the setting change indication 263, and a cancel button 267 for cancelling execution of the print instruction. The constraint screen 261 facilitates the user to change a setting value that is not executable to an executable setting value.

In the above description, the constraint screen 261 is configured to ask the user whether to change the setting value of a print setting. However, the present invention is not limited thereto, and other modes may be used. For example, in order to prevent a setting value corresponding to a common setting constraint from being specified, such setting values may be hidden, displayed in a dim color (so-called a "dimmed out mode"), or forcibly changed to another setting value, on the print setting screen 151.

In the above description, an example has been illustrated in which a group of abstract states and a group of abstract constraint relationships are defined in advance in the relationship storing unit 131, or are defined by an input from the user through the UI display unit 106. However, these pieces of information may be stored in the apparatus constraint storing unit 759 of the image forming apparatus 60 in a production step or by the user and thus may be received from the image forming apparatus 60 when, for example, the image forming apparatus 60 is connected to the network 80.

In the above description, the first abstract state, the second abstract state, and the abstract constraint relationship between the first abstract state and the second abstract state have been illustrated with reference to FIG. 5A. The first abstract state may be regarded as a state in which a print condition is specified, without specifying (without dependence on) any print function of each of the image forming apparatuses 60a and 60b. That is, the first abstract state is designation of a print condition for printing paper, which print condition does not specify any print function. Further, the second abstract state may be regarded as a state in which any of print settings of each of the image forming apparatuses 60a and 60b is specified. That is, the second abstract state is designation of any of print functions of each of plural printers. Further, the abstract constraint relationship may be regarded as a combination of the first and second abstract states.

Other examples of the first abstract state, the second abstract state, and the constraint relationship between (combination of) the first abstract state and the second abstract state include the following.

In an example, a state in which plain paper is specified is set as a first abstract state, and a state in which binding processing is specified is set as a second abstract state. Then, the constraint relationship is "the setting specifying paper types other than plain paper and the binding processing cannot be specified simultaneously".

In another example, a state in which formation of monochrome images such as black-and-white images is specified is set as a first abstract state, and a state in which duplex printing is specified is set as a second state. Then, the constraint relationship is "the output setting specifying formation of images (such as multicolor images) other monochrome images and the duplex printing cannot be specified simultaneously".

Note that the first abstract state may be regarded as a print setting for items other than print functions, that is, may be regarded as any of the setting for the size of paper on which an image is formed, the setting for the material, such as toner, used for forming images, and the setting for images to be formed, such as multicolor images. Further, the second abstract state may be regarded as a print setting for print functions.

In the above description, the print setting set P001 is derived as the intersection of the complement of the print setting set AB001 and the print setting set AB002. However, the present invention is not limited thereto. The set to be derived may be any set that is derived on the basis of the print setting sets AB001 and AB002. For example, a print setting set P002 may be derived as the intersection of the print setting sets AB001 and AB002. The print setting set P002 derived herein is a combination of print settings that can be set in both the image forming apparatuses 60a and 60b.

In the above description, sets (the print setting set AB001 and the print setting set AB002) which include print settings that can realize the first abstract state and the second abstract state, respectively, and which are common to the image forming apparatuses 60a and 60b are derived. As in the case of this configuration, a set of print settings which is common to all the plural image forming apparatuses 60 that the printer driver 102 can control may be derived. Alternatively, for example, in the case where the printer driver 102 can control three or more image forming apparatuses 60, a set of print settings which is common to a specific range of models among the three or more image forming apparatuses 60, that is, which is common to some of the image forming apparatuses 60, may be derived.

In the above description, the set storing unit 132 stores the print setting sets A001, A002, B001, B002, AB001, and AB002. However, the present invention is not limited to this configuration, and these sets may be stored in plural storage units including, for example, a first storing unit for storing the print setting sets A001 and B001 related to the first abstract state, a second storing unit for storing the print setting sets A002 and B002 related to the second abstract state, and a third storing unit for storing the print setting sets AB001 and AB002 which are sets common to the image forming apparatuses 60a and 60b.

A program that realizes the present exemplary embodiment may be provided by a communication unit, and may be provided in the form of a storage medium such as a CD-ROM.

While an exemplary embodiment and variations thereof have been described above, two or more of the above described exemplary embodiment and modifications may be combined.

Further, the foregoing description of the exemplary embodiment of the present invention has been provided for the purposes of illustration and description. It is not intended to be exhaustive or to limit the invention to the precise forms disclosed. Obviously, various other modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print instruction apparatus comprising:
a designation storing unit configured to store a plurality of pieces of designation information, each designating a print condition not specifying any printer;
a combination storing unit configured to store a combination of any of the plurality of pieces of designation information;
a group storing unit configured to store a group of print settings which realize, in each of a plurality of printers, designation indicated by each of the plurality of pieces of designation information stored in the designation storing unit, for each of the plurality of printers; and
at least one processor configured to implement a constraint deriving unit configured to derive a constraint relationship common to the plurality of printers, on the basis of the combination and the group,
wherein the constraint relationship is a combination of print settings that cannot be specified simultaneously in any of the plurality of printers.

2. A print instruction apparatus comprising:
a designation storing unit configured to store a plurality of pieces of designation information, each designating a print condition not specifying any printer;
a combination storing unit configured to store a combination of any of the plurality of pieces of designation information;
a group storing unit configured to store a group of types of print settings capable of realizing, in each of a plurality of printers, designation indicated by each of the plurality of pieces of designation information stored in the designation storing unit, for each of the plurality of printers; and
at least one processor configured to implement a constraint deriving unit configured to derive a constraint relationship common to the plurality of printers, on the basis of the combination stored in the combination storing unit and the group stored in the group storing unit,
wherein the constraint relationship is a combination of print settings that cannot be specified simultaneously in any of the plurality of printers.

3. The print instruction apparatus according to claim 2, wherein:
the designation storing unit is further configured to store a first piece of designation information designating any of print functions of each of the plurality of printers, and a second piece of designation information designating a first print condition for printing paper, the first print condition not specifying any print function;
the combination storing unit is further configured to store a combination of the first piece of designation information designating any of print functions and the second piece of designation information designating the first print condition; and
the constraint deriving unit is further configured to create a group of types of print settings corresponding to the constraint relationship, on the basis of the first piece of designation information designating any of print functions and the second piece of designation information designating the first print condition.

4. A printing system comprising:
a plurality of printers configured to print images; and
a print instruction apparatus configured to instruct the plurality of printers to print the images, the print instruction apparatus including:
a designation storing unit configured to store a plurality of pieces of designation information, each designating a print condition not specifying the plurality of printers,
a combination storing unit configured to store a combination of any of the plurality of pieces of designation information,
a group storing unit configured to store a group of types of print settings capable of realizing, in each of the plurality of printers, designation indicated by each of the plurality of pieces of designation information stored in the designation storing unit, for each of the plurality of printers, and
at least one processor configured to implement a constraint deriving unit configured to derive a constraint relationship common to the plurality of printers, on the basis of the combination stored in the combination storing unit and the group stored in the group storing unit,
wherein the constraint relationship is a combination of print settings that cannot be specified simultaneously in any of the plurality of printers.

5. A non-transitory computer readable medium storing a program causing a computer to execute a print instruction process, the print instruction process comprising:
storing a plurality of pieces of designation information, each designating a print condition not specifying any printer;
storing a combination of any of the plurality of pieces of designation information;
storing a group of types of print settings capable of realizing, in each of a plurality of printers, designation indicated by each of the plurality of pieces of designation information, for each of the plurality of printers; and
deriving a constraint relationship common to the plurality of printers, on the basis of the combination and the group,
wherein the constraint relationship is a combination of print settings that cannot be specified simultaneously in any of the plurality of printers.

* * * * *